United States Patent
Lee et al.

(10) Patent No.: US 7,618,486 B2
(45) Date of Patent: Nov. 17, 2009

(54) PIGMENT DISPERSION COMPOSITION FOR PRODUCING COLOR FILTER AND COLOR FILTER FOR COLOR IMAGING DEVICE PRODUCED USING THE SAME

(75) Inventors: Chang Min Lee, Goyang-si (KR); Kil Sung Lee, Gwacheon-si (KR); Jae Hyun Kim, Seongnam-si (KR); Sung Hyok Kim, Hwaseong-si (KR); Eui June Jeong, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 202 days.

(21) Appl. No.: 11/877,903

(22) Filed: Oct. 24, 2007

(65) Prior Publication Data
US 2008/0145772 A1 Jun. 19, 2008

(30) Foreign Application Priority Data
Dec. 14, 2006 (KR) ...................... 10-2006-0128028

(51) Int. Cl.
*H01L 31/0232* (2006.01)
*G02B 5/22* (2006.01)
*C08K 7/08* (2006.01)
*C08K 5/16* (2006.01)

(52) U.S. Cl. .................. 106/287.25; 106/493; 359/885; 257/294; 257/432; 257/E31.121

(58) Field of Classification Search ............ 106/287.25, 106/493; 359/885; 257/294, 432, E31.121
See application file for complete search history.

(56) References Cited

U.S. PATENT DOCUMENTS

| | | | | |
|---|---|---|---|---|
| 6,302,953 | B1 * | 10/2001 | Saikatsu et al. | 106/498 |
| 6,471,766 | B2 * | 10/2002 | Ohki et al. | 106/498 |
| 7,147,704 | B2 * | 12/2006 | Ueno | 106/498 |
| 7,300,608 | B2 * | 11/2007 | Sunahara et al. | 252/586 |
| 2001/0013303 | A1 * | 8/2001 | Ohki et al. | 106/498 |
| 2009/0074825 | A1 * | 3/2009 | Sun et al. | 424/402 |

FOREIGN PATENT DOCUMENTS

| | | |
|---|---|---|
| JP | 62-136604 A | 6/1987 |
| JP | 8-295820 A | 11/1996 |
| KR | 10-1990-8316 A | 6/1990 |

(Continued)

OTHER PUBLICATIONS

English translation of Abstract for Korean Application No. 10-2002-42613.

(Continued)

*Primary Examiner*—Evan Pert
(74) *Attorney, Agent, or Firm*—Summa, Additon & Ashe, P.A.

(57) ABSTRACT

Disclosed is a pigment dispersion composition for producing a color filter. The pigment dispersion composition comprises a pigment, a binder resin, a dispersant and a solvent. The pigment is a blue anthraquinone pigment and is pretreated with a water-soluble inorganic salt and a wetting agent. The pigment dispersion composition can be used to produce a color filter for a color imaging device with good color separation and high transmittance.

19 Claims, 1 Drawing Sheet

FOREIGN PATENT DOCUMENTS

| KR | 10-2005-85199 A | 8/2005 |
| KR | 10-2006-0118625 A | 11/2006 |
| KR | 10-2002-42613 A | 3/2007 |

OTHER PUBLICATIONS

English translation of Abstract for Korean Application No. 10-2005-0085199.

English translation of Abstract for Korean Application No. 10-1990-8316.

English translation of Abstract for Korean Application No. 10-2006-0118625.

English translation of Abstract for Japanese Application No. 8-295820.

English translation of Abstract for Japanese Application No. 62-136604.

* cited by examiner

PIGMENT DISPERSION COMPOSITION FOR PRODUCING COLOR FILTER AND COLOR FILTER FOR COLOR IMAGING DEVICE PRODUCED USING THE SAME

CROSS-REFERENCE TO RELATED APPLICATION

This non-provisional application claims priority under 35 USC Section 119 from Korean Patent Application No. 10-2006-0128028, filed Dec. 14, 2006, which is hereby incorporated by reference in its entirety.

FIELD OF THE INVENTION

The present invention relates to a coloring composition useful for producing a color filter and a color filter for a color imaging device produced using the same.

BACKGROUND OF THE INVENTION

Generally, color imaging devices, such as complementary metal oxide semiconductors (CMOSs) and charge coupled devices (CCDs), include light detectors and a color filter installed on the light detectors. The color filter is provided with filter segments of three complementary primary colors, i.e. red, green and blue colors, to separate colors.

In recent years, demand has increased for color filters mounted on imaging devices, such as CMOSs and CCDs, to achieve ideal light separation of the imaging devices without affecting the transmission regions of other colors (e.g., so that no blue transmission region exists in a green transmission region).

To meet this demand, a mixture of a blue pigment and a violet pigment is currently used. However, the pigment mixture suffers from an increase of a transmission region at 600-700 nm, which corresponds to the red region of visible light. Further, as the proportion of the violet pigment in the pigment mixture increases, the transmittance in a blue transmission region decreases.

Efforts are being made to achieve more distinct color separation, and in particular better color separation between blue and green regions, by allowing light of shorter wavelengths to transmit through the blue region and light of longer wavelengths to transmit through the green region. However, color separation characteristics of conventional pigment compositions for electronic materials are not satisfactory.

Pigments have been widely used in various applications, including paints, printing inks, color displays, and the like. In these applications, pigments are commonly dispersed in suitable media, such as organic solvents.

To attain high transmittance of the pigment dispersion compositions, the pigment particles must have a small primary particle size below a predetermined limit and must have a spherical shape. Pigment having a primary particle size above the predetermined size limit of the pigments cannot be expected to have the same transmittance after dispersion.

SUMMARY OF THE INVENTION

The present invention provides a pigment dispersion composition comprising fine and spherical pigment particles, which can achieve good color separation and high transmittance. The present invention further provides a color filter produced using the pigment dispersion composition. The pigment dispersion composition of the invention can be useful in the production of a color filter mounted on a color imaging device, such as a CMOS or a CCD.

The pigment dispersion composition of the invention useful for producing a color filter comprises a pigment, a binder resin, a dispersant and a solvent, wherein the pigment is a blue anthraquinone pigment represented by Formula 1:

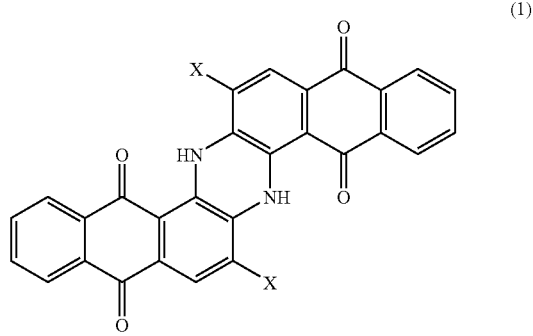

(1)

wherein each X is independently a hydrogen or chlorine atom.

In an embodiment of the present invention, the pigment can be pretreated with a water-soluble inorganic salt and a wetting agent.

In a further embodiment of the present invention, the pretreated pigment can have an average particle diameter (D50) of about 50 to about 100 nm.

In another embodiment of the present invention, the water-soluble inorganic salt can be sodium chloride or potassium chloride.

In another embodiment of the present invention, the wetting agent can be selected from the group consisting of: alkylene glycol monoalkyl ethers, for example, ethylene glycol monoethyl ether, propylene glycol monomethyl ether, diethylene glycol monomethyl ether and ethylene glycol monoethyl ether; alcohols, for example, ethanol, isopropanol, butanol, hexanol, cyclohexanol, ethylene glycol, diethylene glycol, polyethylene glycol and glycerin polyethylene glycol; and mixtures thereof.

In another embodiment of the present invention, the binder resin can be selected from the group consisting of polyacrylate resins, for example, polyethyl methacrylate, polybenzyl methacrylate, polyethylhexyl methacrylate and glycerol methacrylate, and copolymers thereof.

In another embodiment of the present invention, the dispersant can be selected from the group consisting of polycarboxylic acid esters, unsaturated polyamides, polycarboxylic acids, alkyl amine salts of polycarboxylic acids, polyacrylate dispersants, polyethyleneimine dispersants, polyurethane dispersants, and mixtures thereof.

In another embodiment of the present invention, the composition can comprise about 100 parts by weight of the pigment, about 1 to about 50 parts by weight of the binder resin, about 10 to about 80 parts by weight of the dispersant, and about 10 to about 1,000 parts by weight of a solvent.

In another embodiment of the present invention, if necessary, the composition can further comprise a colorant derivative in which a naphthalene, anthraquinone, phthalocyanine, diketopyrrolopyrrole or azo pigment or dye is substituted with at least one substituent selected from amine sulfonate, sodium sulfonate, quaternary amine phosphate, alkyl amine and triazine derivatives.

In another embodiment of the present invention, the colorant derivative can be present in an amount of about 1 to about 20 parts by weight, based on 100 parts by weight of the pigment.

In still another embodiment of the present invention, the pigment dispersion composition can have a transmittance of about 75 to about 95%.

In accordance with another aspect of the present invention, there is provided a color filter for a color imaging device produced using the pigment dispersion composition.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
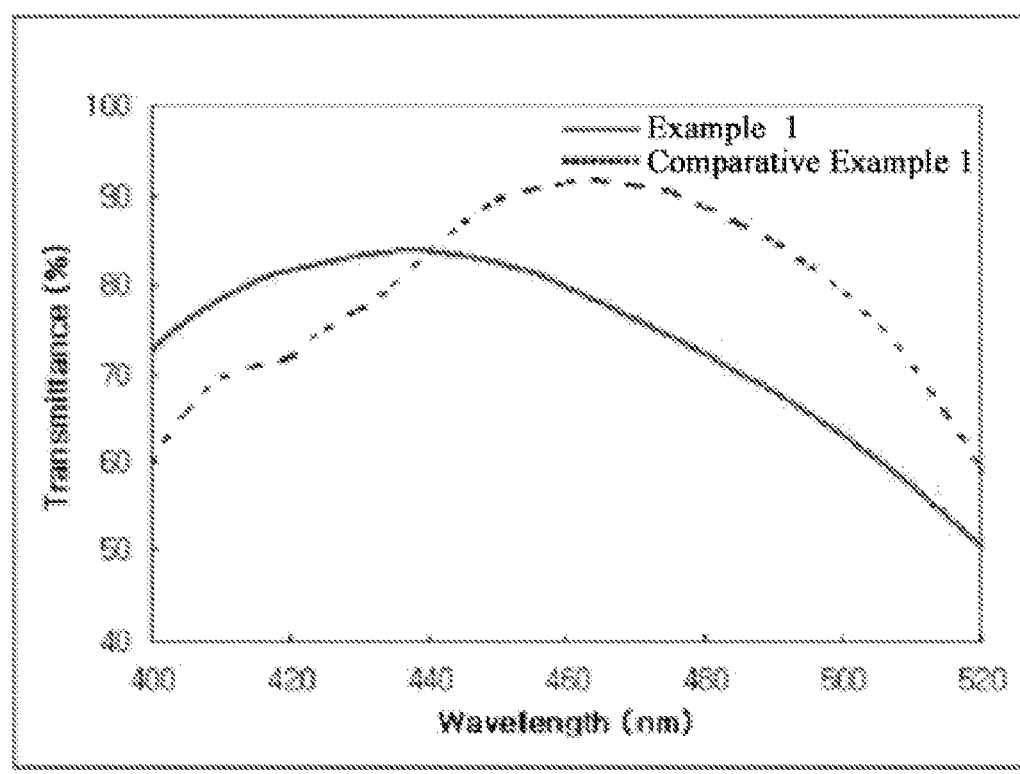
FIG. 1 is a graph comparing the analytical results of a transmittance spectrum of a pigment dispersion composition prepared in Example 1 with those of transmittance spectrum of a pigment dispersion composition prepared in Comparative Example 1.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The pigment dispersion composition of the present invention includes a blue anthraquinone pigment represented by Formula 1:

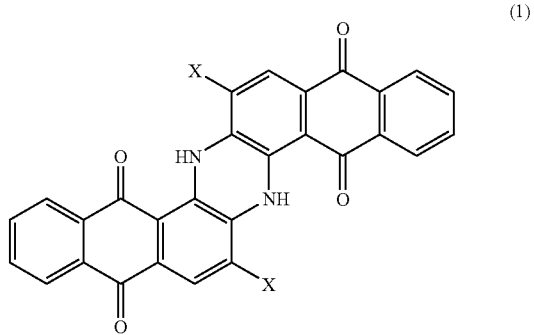

(1)

wherein each X is independently a hydrogen or chlorine atom.

The pigment may be C. I. Pigment Blue 60 (available from Ciba Specialty Chemicals), C. I. Pigment Blue 64 (available from Ciba Specialty Chemicals), or a mixture thereof.

If needed, the pigment can be pretreated with a water-soluble inorganic salt and a wetting agent to improve the transmittance of the pigment dispersion composition.

The pretreatment can be carried out to reduce the primary particle size of the pigment, i.e., to make the primary particle size fine.

The pigment can be pretreated by the following procedure:

(1) The pigment can be kneaded using a water-soluble inorganic salt and a wetting agent;

(2) The kneaded mixture can be subjected to wet pulverization; and (3) The wet-pulverized mixture can be filtered and washed with water.

Examples of water-soluble inorganic salts that can be added during kneading of the pigment include sodium chloride and potassium chloride, as well as mixtures thereof.

The wetting agent added in combination with the water-soluble inorganic salt during kneading of the pigment can serve to uniformly harden the pigment and the inorganic salt. Examples of such wetting agents include without limitation: alkylene glycol monoalkyl ethers, for example, ethylene glycol monoethyl ether, propylene glycol monomethyl ether, diethylene glycol monomethyl ether and ethylene glycol monoethyl ether; and alcohols, for example, ethanol, isopropanol, butanol, hexanol, cyclohexanol, ethylene glycol, diethylene glycol, polyethylene glycol and glycerin polyethylene glycol. These wetting agents may be used alone or as a mixture of two or more thereof.

The average particle diameter of the anthraquinone pigment pretreated by kneading can be measured by transmission electron microscopy (TEM).

The shape of C. I. Pigment Blue 60 as the anthraquinone pigment can be changed from a needle shape having a length more than about 200 nm to a spherical shape having a diameter of about 30 to about 100 nm, as determined by transmission electron microscopy (TEM).

The pretreated pigment can have an average particle diameter (D50) of about 50 to about 100 nm. If the average particle diameter of the pretreated pigment is less than about 50 nm, the durability (e.g., resistance to heat and light) of a pattern formed using the pigment dispersion composition may deteriorate. If the average particle diameter of the pretreated pigment is above about 100 nm, problems may result during the formation of a fine pattern using the pigment dispersion composition.

The pigment dispersion composition of the present invention uses a binder resin. The binder resin can be a polymer having an acid group, and examples thereof include without limitation polyacrylate resins, such as polyethyl methacrylate, polybenzyl methacrylate, polyethylhexyl methacrylate, glycerol methacrylate, and copolymers thereof. These binder resins may be used alone or as a mixture of two or more thereof.

The binder resin can be present in the pigment dispersion composition of the invention in an amount of about 1 to about 50 parts by weight, based on 100 parts by weight of the pigment. The use of the binder resin in an amount of less than about 1 part by weight can make it difficult to ensure effective dispersion and dispersion stability of the pigment. Meanwhile, the use of the binder resin in an amount greater than about 50 parts by weight can cause a marked increase in the viscosity of the final product, leading to deteriorated optical, physical and chemical quality of the final product.

Representative examples of dispersants that can be used in the present invention include without limitation polycarboxylic acid esters, unsaturated polyamides, polycarboxylic acids, alkyl amine salts of polycarboxylic acids, polyacrylate dispersants, polyethyleneimine dispersants, and polyurethane dispersants. These dispersants may be used alone or as a mixture of two or more thereof.

The dispersant can be present in the pigment dispersion composition of the present invention in an amount of about 10 to about 80 parts by weight, based on 100 parts by weight of the pigment.

The use of the dispersant in an amount smaller than about 10 parts by weight can make it difficult to ensure effective dispersion of the pigment. Meanwhile, the use of the dispersant in an amount exceeding about 80 parts by weight can cause a marked increase in the viscosity of the final product, leading to deteriorated optical, physical and chemical quality of the final product.

Examples of dispersant useful in the present invention include without limitation dispersant products sold under the trade marks: Disperse BYK 161, Disperse BYK 163, Disperse BYK 164, Disperse BYK 2000 and Disperse BYK 2001, all of which are available from BYK; EFKA 4046 and EFKA 4047, all of which are available from EFKA; and Solsperse 24000 available from Lubrizol.

The pigment dispersion composition of the present invention uses any known solvent, without any particular limitation. A mixture of two or more known solvents may be used, if needed. Examples of such solvents include without limitation: alcohols, such as methanol and ethanol; ethers, such as dichloroethyl ether, n-butyl ether, diisoamyl ether, methyl phenyl ether and tetrahydrofuran; glycol ethers, such as ethylene glycol monomethyl ether and ethylene glycol monoethyl ether; cellosolve acetates, such as methyl cellosolve acetate, ethyl cellosolve acetate and diethyl cellosolve acetate; carbitols, such as methyl ethyl carbitol, diethyl carbitol, diethylene glycol monomethyl ether, diethylene glycol monoethyl ether, diethylene glycol dimethyl ether, diethylene glycol methyl ethyl ether and diethylene glycol diethyl ether; propylene glycol alkyl ether acetates, such as propylene glycol methyl ether acetate and propylene glycol propyl ether acetate; aromatic hydrocarbons, such as toluene and xylene; ketones, such as methyl ethyl ketone, cyclohexanone, 4-hydroxy-4-methyl-2-pentanone, methyl-n-propyl ketone, methyl-n-butyl ketone, methyl-n-amyl ketone and 2-heptanone; saturated aliphatic monocarboxylic acid alkyl esters, such as ethyl acetate, n-butyl acetate and isobutyl acetate; lactates, such as methyl lactate and ethyl lactate; alkyl oxyacetates, such as methyl oxyacetate, ethyl oxyacetate and butyl oxyacetate; alkyl alkoxyacetates, such as methyl methoxyacetate, ethyl methoxyacetate, butyl methoxyacetate, methyl ethoxyacetate and ethyl ethoxyacetate; alkyl 3-oxypropionates, such as methyl 3-oxypropionate and ethyl 3-oxypropionate; alkyl 3-alkoxypropionates, such as methyl 3-methoxyproplonate, ethyl 3-methoxypropionate, ethyl 3-ethoxypropionate and methyl 3-ethoxypropionate; alkyl 2-oxypropionates, such as methyl 2-oxypropionate, ethyl 2-oxypropionate and propyl 2-oxypropionate; alkyl 2-alkoxypropionates, such as methyl 2-methoxypropionate, ethyl 2-methoxypropionate, ethyl 2-ethoxyproplonate and methyl 2-ethoxypropionate; 2-oxy-2-methylpropionic acid esters, such as methyl 2-oxy-2-methylpropionate and ethyl 2-oxy-2-methylpropionate; alkyl monooxymonocarboxylates of alkyl 2-alkoxy-2-methyl propionates, such as methyl 2-methoxy-2-methylpropionate and ethyl 2-ethoxy-2-methylpropionate; esters, such as ethyl 2-hydroxypropionate, ethyl 2-hydroxy-2-methylpropionate, ethyl hydroxyacetate and methyl 2-hydroxy-3-methylbutanoate; and ketonic acid esters, such as ethyl pyruvate. Additional solvents useful in the present invention can include without limitation N-methylformamide, N,N-dimethylformamide, N-methylformanilide, N-methylacetamide, N,N-dimethylacetamide, N-methylpyrrolidone, dimethylsulfoxide, benzyl ethyl ether, dihexyl ether, acetonylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate and phenyl cellosolve acetate.

Glycol ethers can provide desired compatibility and reactivity. Glycol ethers useful in the invention include without limitation ethylene glycol monoethyl ether; ethylene glycol alkyl ether acetates, such as ethyl cellosolve acetate; esters, such as ethyl 2-hydroxypropionate; diethylene glycols, such as diethylene glycol monomethyl ether; and propylene glycol alkyl ether acetates, such as propylene glycol methyl ether acetate and propylene glycol propyl ether acetate.

The solvent is used in an amount of about 10 to about 1,000 parts by weight, for example, about 20 to about 500 parts by weight, based on 100 parts by weight of the pigment. The use of the solvent in an amount of less than about 10 parts by weight can cause an excessive increase in the viscosity of the pigment dispersion composition. Meanwhile, the use of the solvent in an amount larger than about 1,000 parts by weight may cause a decrease in the viscosity of the composition, leading to a negative influence on the physical and optical properties of the final product.

In addition to the pigment, if necessary, the pigment dispersion composition of the present invention may further comprise a colorant derivative. The colorant derivative as used herein refers to a compound in which at least one substituent is introduced into a pigment or dye. The pigment used in the colorant derivative may be one of the pigments mentioned above. The colorant derivative may be one in which a naphthalene, anthraquinone, phthalocyanine, diketopyrrolopyrrole or azo pigment or dye is substituted with at least one substituent selected from amine sulfonate, sodium sulfonate, quaternary amine phosphate, alkyl amine and triazine derivatives.

The content of the colorant derivative in the composition of the present invention can range from about 1 to about 20 parts by weight, based on 100 parts by weight of the pigment.

The pigment dispersion composition of the present invention can have a transmittance ranging from about 75% to about 95%. Only when a color filter exhibits a high transmittance in red, green and blue regions, visually distinct colors can be realized. For example, a sufficient amount of light cannot reach a blue region through a color filter produced using a composition having a transmittance lower than 75%. After light transmits through a color filter produced using a composition having a transmittance higher than 95%, color interference may occur in blue, green and red regions.

Hereinafter, the present invention will be explained in more detail with reference to the following examples. However, these examples are given for the purpose of illustration only and are not intended to limit the scope of the invention.

EXAMPLES

Preparative Example 1

A mixture having the following composition is prepared:

| | |
|---|---|
| C. I. Pigment Blue 60 (CROMOPHTAL BLUE A3R, Ciba Specialty Chemicals) | 1 part by weight |
| Sodium chloride | 10 parts by weight |
| Polyethylene glycol 400 (Sigma Aldrich) | 4 parts by weight |

The mixture is kneaded in a kneader for 12 hours. The kneaded mixture is added to 5 parts by weight of water in a mixer and stirred for one hour to obtain a slurry. The slurry is filtered, washed with water, and dried in a vacuum oven at 40° C. for one day to prepare a dry powder of the C. I. Pigment Blue 60.

Preparative Example 2

The procedure of Preparative Example 1 is repeated except that C. I. Pigment Blue 64 was used as a pigment instead of C. I. Pigment Blue 60 to prepare a dry powder of the C. I. Pigment Blue 64.

Example 1

A mixture having the following composition is prepared:

| | |
|---|---|
| Dry powder of C. I. Pigment Blue 60 (prepared in Preparative Example 1) | 15 parts by weight |

-continued

| | |
|---|---|
| Polyester dispersant (EFKA 4046, EFKA) | 20 parts by weight |
| Polybenzyl methacrylate resin (Sigma Aldrich) | 8 parts by weight |
| Propylene glycol methyl ethyl acetate (Sigma Aldrich) | 55 parts by weight |
| Colorant derivative (Solsperse 5000, Lubrizol) | 2 parts by weight |

The mixture is dispersed using a bead mill for 3 hours to prepare a pigment dispersion composition.

Example 2

A pigment dispersion composition is prepared in the same manner as in Example 1, except that the dry pigment powder prepared in Preparative Example 2 is used.

Comparative Example 1

A pigment dispersion composition is prepared in the same manner as in Example 1 or 2, except that a phthalocyanine pigment (EF-CFX, Dainippon Ink & Chemicals) is used instead of the blue anthraquinone pigment.

Test Example 1

Measurement of Average Primary Particle Diameter of Pigments

Transmission electron microscopy (TEM) is used to measure the average primary particle diameters of the pigments used in Examples 1 and 2 and Comparative Example 1. The results are shown in Table 1.

TABLE 1

| | Pigment (Example 1) | Pigment (Example 2) | Pigment (Comparative Example 1) |
|---|---|---|---|
| Average particle diameter (nm) | 50 | 70 | 200 |
| Particle shape | Spherical | Spherical | Needle |

The data shown in Table 1 demonstrate that the particle diameters of the pigments after kneading, which are used in Examples 1 and 2, are much finer than the particle diameter of the pigment before kneading, which is used in Comparative Example 1, and that the shape of the pigment particles used in Examples 1 and 2 is changed to a spherical shape, which is advantageous in terms of dispersion and results in high transmittance.

Test Example 2

Measurements of Particle Size and Viscosity of Pigment Dispersion Compositions

The pigment dispersion compositions prepared in Examples 1 and 2 and Comparative Example 1 are measured for particle size and viscosity using a particle size analyzer (LB 500, Horiba Instruments, Inc.) and a viscometer (DVIII Ultra, Brookfield). The results are shown in Table 2.

TABLE 2

| | Pigment dispersion composition (Example 1) | Pigment dispersion composition (Example 2) | Pigment dispersion composition (Comparative Example 1) |
|---|---|---|---|
| Average particle diameter (nm) | 56 | 75 | 90 |
| Viscosity (cP) | 5.7 | 6.3 | 6 |

As can be seen from the results of Table 2, although the particle diameters of the pigments used in the pigment dispersion compositions of the present invention are much smaller than the particle diameter of the pigment used in the pigment dispersion composition prepared in Comparative Example 1, there is no significant difference in viscosity between the pigment dispersion compositions of the present invention and the pigment dispersion composition prepared in Comparative Example 1. These results indicate that the pigment dispersion compositions of the present invention show high dispersion stability.

Test Example 3

Analysis of Transmittance Spectra

The pigment dispersion compositions prepared in Example 1 and Comparative Example 1 are spin-coated to a thickness of 1 μm on respective glass substrate to obtain samples. The transmittance of the samples is measured using a transmittance meter, and the results are shown in FIG. 1.

The maximum transmittance ($T_{max}$) of the pigment dispersion composition using the blue anthraquinone pigment is observed to be shifted to a shorter wavelength region by about 25 nm than that of the pigment dispersion composition using the phthalocyanine pigment. This observation demonstrates that the pigment dispersion composition prepared in Example 1 show better color separation than the pigment dispersion composition prepared in Comparative Example 1.

As apparent from the above description, the use of fine and spherical pigment particles in the pigment dispersion composition for producing a color filter according to the present invention can provide good color separation and high transmittance. In addition, the pigment dispersion composition of the present invention can be used to produce a color filter with good color separation and high transmittance.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A pigment dispersion composition for producing a color filter, the composition comprising:
   a pigment,
   a binder resin,
   a dispersant, and
   a solvent, wherein the pigment is a blue anthraquinone pigment represented by Formula 1:

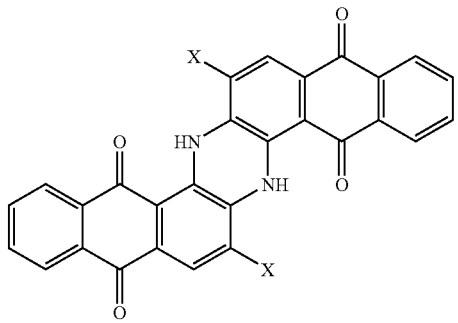

wherein each X is independently a hydrogen or chlorine atom.

2. The composition according to claim 1, wherein the pigment is pretreated with a water-soluble inorganic salt and a wetting agent.

3. The composition according to claim 2, wherein the pretreated pigment has an average particle diameter (D50) of about 50 to about 100 nm.

4. The composition according to claim 2, wherein the pretreated pigment has a substantially spherical particle shape.

5. The composition according to claim 2, wherein the water-soluble inorganic salt is sodium chloride or potassium chloride.

6. The composition according to claim 2, wherein the wetting agent is selected from the group consisting of alkylene glycol monoalkyl ethers; alcohols; and mixtures thereof.

7. The composition according to claim 6, wherein the alkylene glycol monoalkyl ether is selected from the group consisting of ethylene glycol monoethyl ether, propylene glycol monomethyl ether, diethylene glycol monomethyl ether, ethylene glycol monoethyl ether, and mixtures thereof; and the alcohol is selected from the group consisting of ethanol, isopropanol, butanol, hexanol, cyclohexanol, ethylene glycol, diethylene glycol, polyethylene glycol, glycerin polyethylene glycol, and mixtures thereof.

8. The composition according to claim 1, wherein the binder resin comprises a polyacrylate resin.

9. The composition according to claim 8, wherein the polyacrylate resin comprises a resin selected from the group consisting of polyethyl methacrylate, polybenzyl methacrylate, polyethylhexyl methacrylate, glycerol methacrylate, and mixtures and copolymers thereof.

10. The composition according to claim 1, wherein the dispersant is selected from the group consisting of polycarboxylic acid esters, unsaturated polyamides, polycarboxylic acids, alkyl amine salts of polycarboxylic acids, polyacrylate dispersants, polyethyleneimine dispersants, polyurethane dispersants, and mixtures thereof.

11. The composition according to claim 1, wherein the composition comprises about 100 parts by weight of the pigment, about 1 to about 50 parts by weight of the binder resin, about 10 to about 80 parts by weight of the dispersant, and about 10 to about 1,000 parts by weight of a solvent.

12. The composition according to claim 1, further comprising a colorant derivative comprising a naphthalene, anthraquinone, phthalocyanine, diketopyrrolopyrrole or azo pigment or dye substituted with at least one substituent selected from the group consisting of amine sulfonate, sodium sulfonate, quaternary amine phosphate, alkyl amine and triazine derivatives.

13. The composition according to claim 12, comprising the colorant derivative in an amount of about 1 to about 20 parts by weight, based on 100 parts by weight of the pigment.

14. The composition according to claim 1, wherein the composition has a transmittance of about 75 to about 95%.

15. The composition according to claim 1, wherein said pigment is C. I. Pigment Blue 60 or C. I. Pigment Blue 64 pretreated with sodium chloride and polyethylene glycol.

16. The composition according to claim 15, wherein said binder resin is polybenzyl methacrylate resin and said dispersant is a polyester dispersant.

17. A color filter for a color imaging device produced using a pigment dispersion composition comprising:
a pigment,
a binder resin,
a dispersant, and
a solvent,
wherein the pigment is a blue anthraquinone pigment represented by Formula 1:

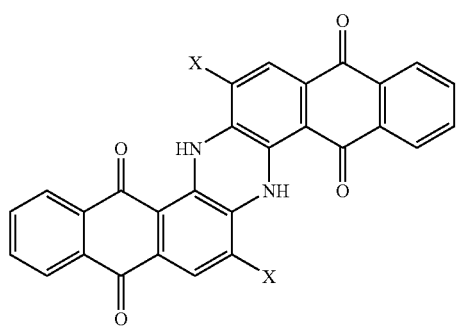

wherein each X is independently a hydrogen or chlorine atom.

18. A color imaging device comprising a color filter produced using a pigment dispersion composition comprising:
a pigment,
a binder resin,
a dispersant, and
a solvent,
wherein the pigment is a blue anthraquinone pigment represented by Formula 1:

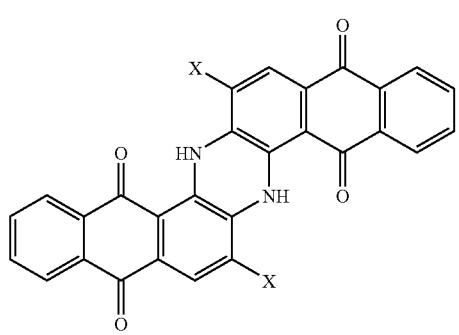

wherein each X is independently a hydrogen or chlorine atom.

19. The color imaging device according to claim 18, wherein said color imaging device is a complementary metal oxide semiconductor (CMOS) or a charge coupled device (CCD).

* * * * *